US010976515B2

(12) United States Patent
Okada (10) Patent No.: US 10,976,515 B2
(45) Date of Patent: Apr. 13, 2021

(54) ROTATIONAL FORCE TRANSMITTING APPARATUS, LENS APPARATUS AND IMAGING APPARATUS HAVING THE SAME

(71) Applicant: CANON KABUSHIKI KAISHA, Tokyo (JP)

(72) Inventor: Tadanori Okada, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 112 days.

(21) Appl. No.: 16/296,528

(22) Filed: Mar. 8, 2019

(65) Prior Publication Data

US 2019/0285831 A1  Sep. 19, 2019

(30) Foreign Application Priority Data

Mar. 13, 2018  (JP) .............................. JP2018-045154

(51) Int. Cl.
| | |
|---|---|
| *G02B 7/02* | (2021.01) |
| *G02B 3/00* | (2006.01) |
| *G02B 7/04* | (2021.01) |
| *H04N 5/225* | (2006.01) |
| *H02N 2/12* | (2006.01) |
| *H02N 2/14* | (2006.01) |
| *H02N 2/00* | (2006.01) |

(52) U.S. Cl.
CPC ............... *G02B 7/04* (2013.01); *H02N 2/006* (2013.01); *H02N 2/123* (2013.01); *H02N 2/14* (2013.01); *H04N 5/2254* (2013.01)

(58) Field of Classification Search
CPC . G02B 7/08; G02B 7/021; G02B 7/02; G02B 7/023; G02B 7/04; G02B 3/00; G02B 7/00; G02B 7/001; G02B 7/004; G02B 7/005; G02B 7/022; G02B 7/026; G02B 7/10; G02B 7/105; G02B 7/1827; G11B 7/0932; G11B 7/0935; G03B 5/00; G03B 2205/0069; H04N 5/2254
USPC ................ 359/811–830, 642; 348/335–369, 348/204.1–204.3, 204.99, 373–375; 396/529, 133
See application file for complete search history.

(56) References Cited

U.S. PATENT DOCUMENTS

| | | | |
|---|---|---|---|
| 9,121,735 | B2 | 9/2015 | Noguchi |
| 9,411,123 | B2 | 8/2016 | Torii |

FOREIGN PATENT DOCUMENTS

| | | |
|---|---|---|
| JP | S60115215 U | 8/1985 |
| JP | H09159898 A | 6/1997 |
| JP | H09251125 A | 9/1997 |
| JP | H10186207 A | 7/1998 |
| JP | H10319300 A | 12/1998 |

(Continued)

OTHER PUBLICATIONS

Office Action issued in Japanese Application No. 2018-045154 dated Mar. 3, 2020. English translation provided.

*Primary Examiner* — Dawayne Pinkney
(74) *Attorney, Agent, or Firm* — Rossi, Kimms & McDowell LLP (57) ABSTRACT

A rotational force transmitting apparatus includes a cylindrical fixed member, a rotating member configured to rotate around the cylindrical fixed member, a first bearing member held by the cylindrical fixed member and configured to rotate around an axis parallel to a rotation axis of the rotating member, and a second bearing member held by the cylindrical fixed member and configured to rotate around a radial direction of the rotating member.

13 Claims, 5 Drawing Sheets

(56) References Cited

FOREIGN PATENT DOCUMENTS

| | | | |
|---|---|---|---|
| JP | 2009237213 | A | 10/2009 |
| JP | 2011090033 | A | 5/2011 |
| JP | 2014035438 | A | 2/2014 |

ROTATIONAL FORCE TRANSMITTING APPARATUS, LENS APPARATUS AND IMAGING APPARATUS HAVING THE SAME

BACKGROUND OF THE INVENTION

Field of the Invention

The present invention relates to a rotational force transmitting apparatus, a lens apparatus and an imaging apparatus having the same.

Description of the Related Art

A lens barrel used for a digital camera, a video camera, etc., transmits a rotational force from a driving source, such as a motor, to a fixed-position rotary ring or a cam ring, and drives a lens through rotating of the fixed-position rotary ring or the cam ring. It is necessary to steadily drive the fixed-position rotary ring and the cam ring in order to improve the positional accuracy for focusing etc. Accordingly, Japanese Patent Laid-Open No. ("JP") 9-159898 discloses an optical apparatus that rotates an annular ultrasonic motor using a ball race. The structure of JP 9-159898 can reduce a driving force loss due to a sliding friction through rolling.

However, the ball race as in the optical apparatus disclosed in JP 9-159898 needs an annular member for pressing the ball. Thus, a large space is necessary in each of the radial direction and the rotational axis direction, and the optical apparatus becomes larger.

SUMMARY OF THE INVENTION

The present invention provides a compact rotational force transmitting apparatus, a lens apparatus and an imaging apparatus having the same, each of which can steadily hold a rotating member.

A rotational force transmitting apparatus according to one aspect of the present invention includes a cylindrical fixed member, a rotating member configured to rotate around the cylindrical fixed member, a first bearing member held by the cylindrical fixed member and configured to rotate around an axis parallel to a rotation axis of the rotating member, and a second bearing member held by the cylindrical fixed member and configured to rotate around a radial direction of the rotating member.

A lens apparatus according to another aspect of the present invention includes a lens, and the above rotational force transmitting apparatus. An imaging apparatus according to still another aspect of the present invention includes the above lens apparatus, an image sensor configured to photoelectrically convert an optical image formed by the lens apparatus, and a camera body configured to hold the image sensor.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention.

Figure 1:
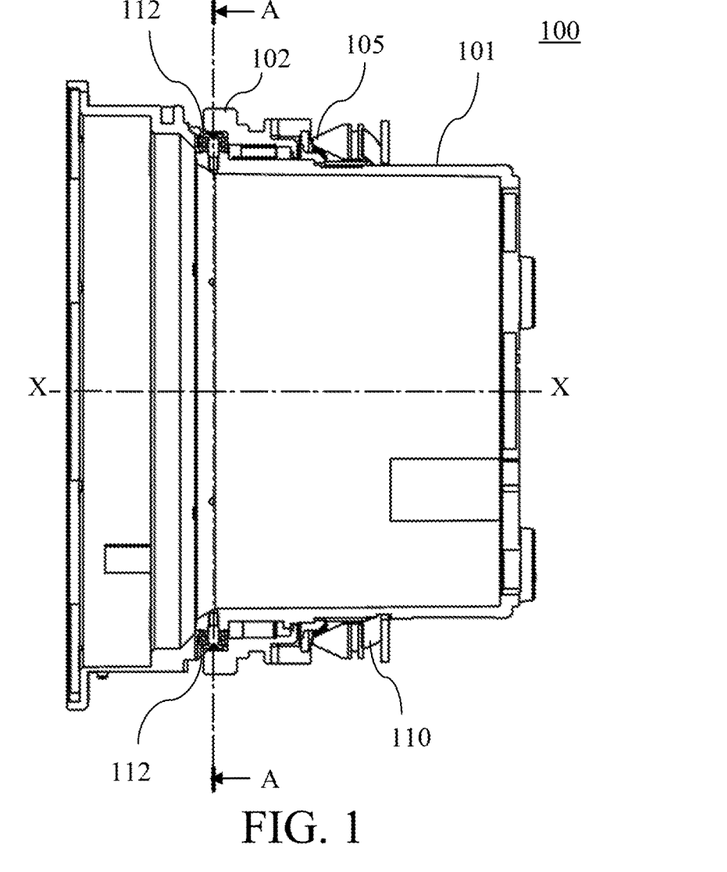
FIG. 1 is a sectional view of an ultrasonic motor unit according to this embodiment.
Figure 2:
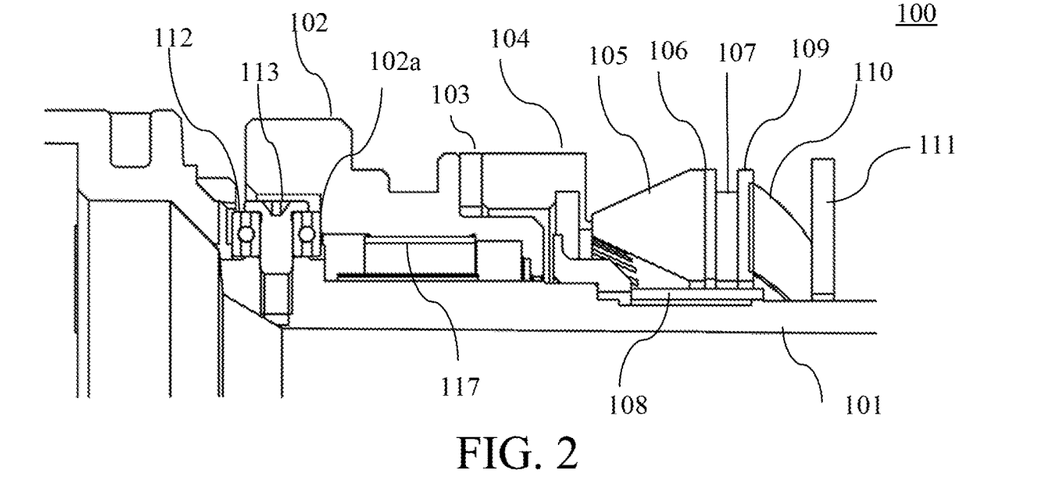
FIG. 2 is an enlarged view of principal part in the ultrasonic motor unit according to this embodiment.
Figure 3:
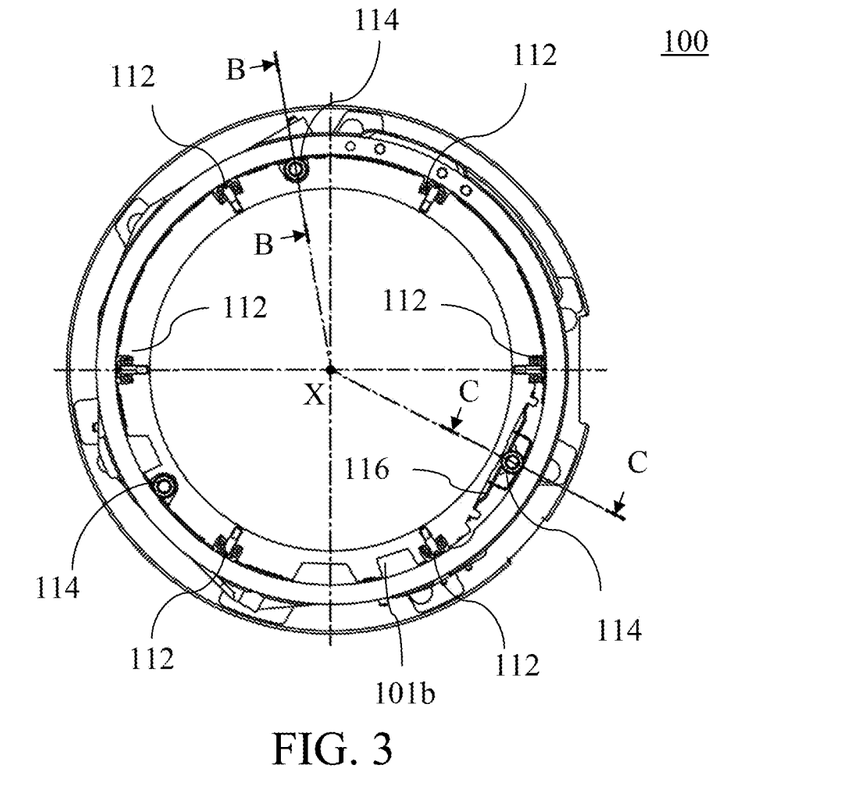
FIG. 3 is a sectional view of the ultrasonic motor unit according to this embodiment taken along a line A-A.

Referring now to FIGS. 1 to 3, a description will be given of an ultrasonic motor unit (vibration type motor unit, rotational force transmitting apparatus) according to this embodiment. FIG. 1 is a sectional view of an ultrasonic motor unit 100. FIG. 2 is an enlarged view (sectional view) of principal part in the ultrasonic motor unit 100 illustrated in FIG. 1. FIG. 3 is a sectional view of the ultrasonic motor unit 100 taken along a line A-A in FIG. 1.

Figure 9:
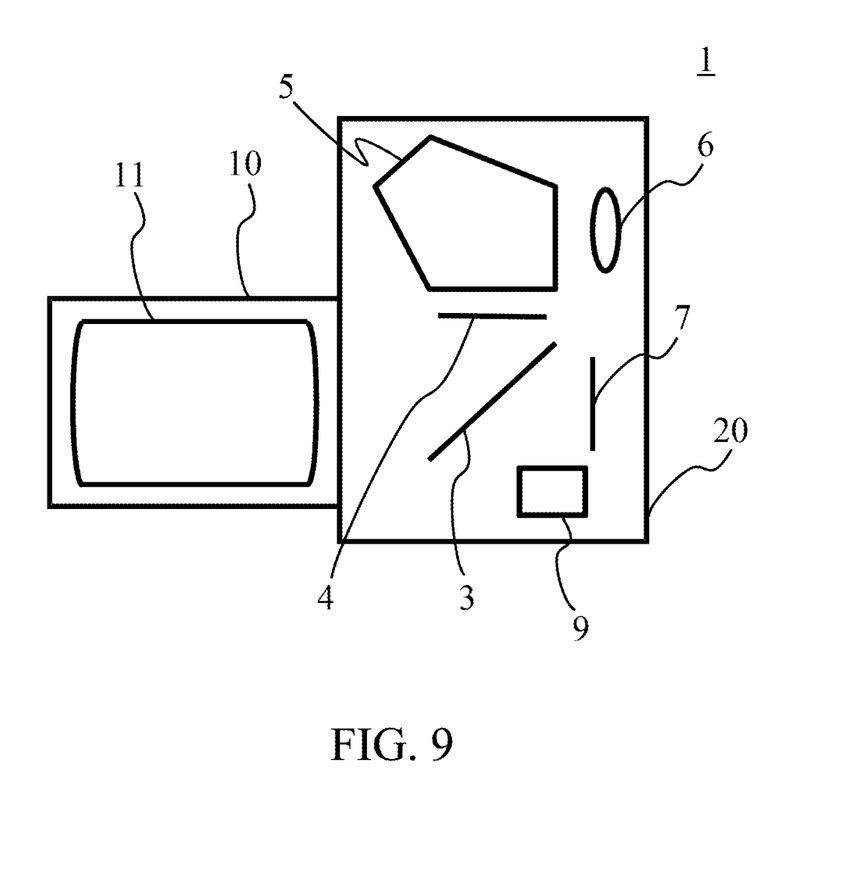
FIG. 9 is a configuration diagram of an imaging apparatus according to this embodiment.

In FIGS. 1 and 2, a fixed barrel or cylinder 101 is a cylindrical fixed member made of a resin material, and has an attachment portion fixed to a fixed portion in the lens barrel 10 (see FIG. 9). A rotary ring 102 is disposed on the outer periphery of the fixed barrel 101 and rotated around the fixed barrel 101 by an ultrasonic motor. This embodiment makes the rotary ring 102 of a metallic material, but is not limited to this example. A rubber ring 103 is adhered to an end surface of the rotary ring 102, and an annular rotor 104 is adhered to the opposite side of the rubber ring 103. Due to this configuration, the rotary ring 102, the rubber ring 103, and a rotor 104 integrally rotate around a rotation axis (an axis X-X). In this embodiment, a rotating member includes the rotary ring 102, the rubber ring 103, and the rotor 104.

A stator 105 is held by the fixed barrel 101. A periodic groove is formed at the tip of the stator 105, and the stator 105 is disposed so as to always contact the rotor 104. A piezoelectric element 106 is pasted to the stator 105. The stator 105 vibrates the piezoelectric element 106, and a contact portion of the stator 105 with the rotor 104 elliptically moves, thereby applying a rotational force to the rotor 104. These components are based on the principle of a general ultrasonic motor. The stator 105 is held by buffering members 107 and 108 each made of a sponge elastic material. The buffering members 107 and 108 serve to hold the stator 105 without hindering the vibration of the stator 105. The buffering member 108 is held by a spring press plate 111 across a metal ring 109 and a wave washer 110. The stator 105 is biased against the rotor 104 by the wave washer 110 with a predetermined pressure, and the pressing force can be adjusted by shifting the position of the spring press plate 111 in the rotation axis direction. Thus, the wave washer 110 is a spring member that presses the stator 105 against the rotor 104.

As illustrated in FIG. 2, the rotary ring 102 contacts a bearing (second bearing member) 112 as a support member in the rotation axis direction at an end surface 102a. The bearing 112 is fixed onto the fixed barrel 101 by a shaft screw 113. Thus, the bearing 112 is held by the fixed barrel 101, rotates around the radial direction of the rotary ring 102, and contacts the rotary ring 102 in the rotation axis direction of the rotary ring 102. In this embodiment, as illustrated in FIG. 3, six bearings 112 are arranged at substantially equal intervals in the circumferential direction (around the rotation axis). The rotor 104 is biased by the wave washer (second biasing member) 110 and always contacts the bearing 112, thereby the rotor 104 is steadily held in the rotation axis direction.

Figure 4:
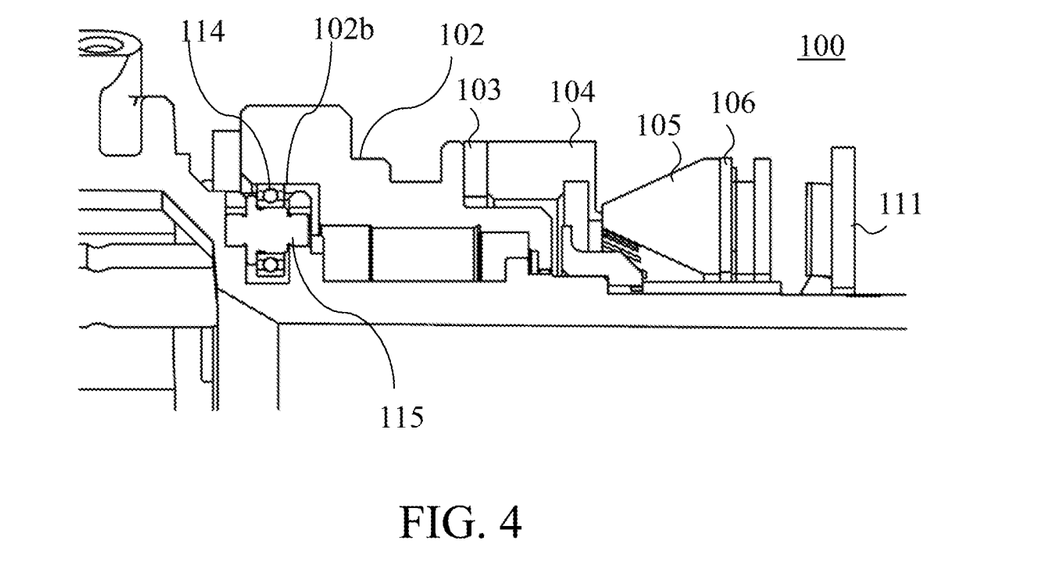
FIG. 4 is a sectional view of the ultrasonic motor unit according to this embodiment taken along a line B-B.

FIG. 4 is a sectional view of the ultrasonic motor unit 100 taken along a line B-B in FIG. 3. As illustrated in FIG. 4, the rotary ring 102 is supported in the radial direction while contacting a bearing (first bearing member) 114 on an inner circumferential surface 102b. A shaft 115 is inserted into the bearing 114. The shaft 115 is held while its both ends are engaged with grooves formed in the fixed barrel 101. Thus, the bearing 114 is held by the fixed barrel 101, rotates around an axis parallel to the rotation axis of the rotary ring 102, and contacts the rotary ring 102 in the radial direction of the rotary ring 102. This embodiment arranges, as illustrated in FIG. 3, three bearings 114 at substantially equal intervals in the circumferential direction (around the rotation axis). One of the three bearings 114 (the first bearing among the plurality of bearings 114 included in the first bearing member) is radially biased by a plate or leaf spring 116 (see FIG. 5). On the other hand, the other two of the three bearings 114 (the second bearings among the plurality of bearings 114 included in the first bearing member) are fixed.

Figure 5:
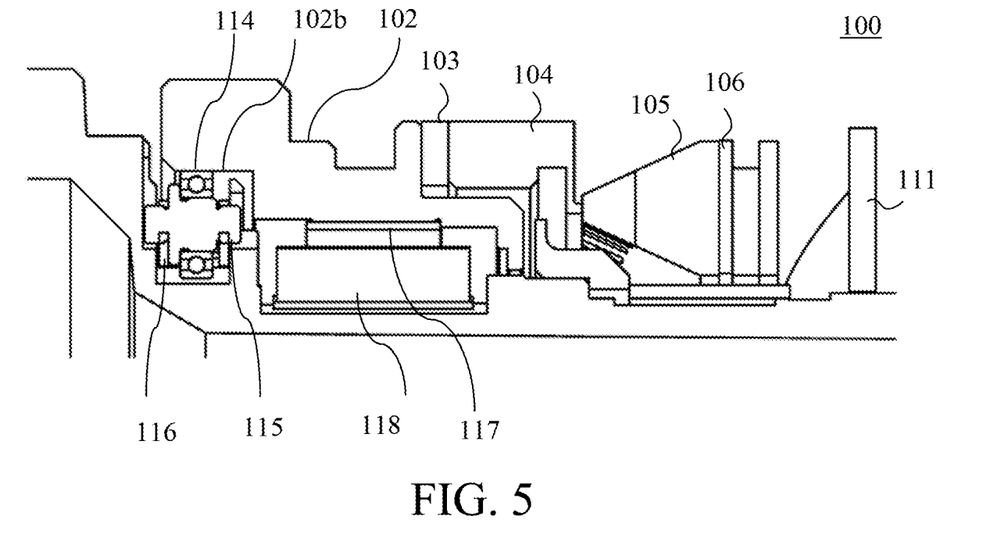
FIG. 5 is a sectional view of the ultrasonic motor unit according to this embodiment taken along a line C-C.

FIG. 5 is a sectional view of the ultrasonic motor unit 100 taken along a line C-C in FIG. 3. Both ends of the shaft 115 in the bearing 114 are held by the plate spring (first biasing member) 116 and biased in a radial direction. In other words, the plate spring 116 biases the bearing 114 in the radial direction. Due to this configuration, one bearing 114 biased by the plate spring 116 maintains the steadiness while the rotation axis is maintained constant by the two fixed bearings 114. Hence, the rotary ring 102 can accurately rotate while the steadiness in the rotation axis direction and the steadiness in the radial direction are maintained. This embodiment uses a bearing that contacts the rotating member (including the rotary ring 102 and the rotor 104) in each of the rotational axis direction and the radial direction, reduces the friction caused loss, and prevents the rotational torque by the ultrasonic motor from attenuating.

Next follows a description of a compact configuration using a plurality of bearings. As illustrated in FIG. 3, the plurality of bearings 112 and 114 are arranged at approximately the same position (on substantially the same plane orthogonal to the rotation axis) in the rotation axis direction (direction along the axis X). The plurality of bearings 112 and 114 are arranged on the circumference so that they are spaced from the rotation axis by substantially the same radial distances. The configuration of this embodiment can save the space as compared with the conventional configuration employing the ball race. This embodiment can space the plurality of bearings 112 and 114 from one another with gaps, respectively, and does not require a space over the entire circumference. This configuration can dispose another member in the gap between adjacent bearings, and can make compact the ultrasonic motor unit 100.

As illustrated in FIG. 3, the first bearing member may include a plurality of (three in this embodiment) bearings 114 around the rotation axis of the rotary ring 102. The second bearing member includes a plurality of (six in this embodiment) bearings 112 around the rotation axis of the rotary ring 102. The first bearing member and the second bearing member may not overlap each other when viewed from the rotation axis direction (direction perpendicular to the paper surface of FIG. 3). The first bearing member and the second bearing member may be arranged on the same circumference. This embodiment sets the biasing force of the wave washer (the second biasing member) 110 larger than that of the plate spring (the first biasing member) 116. Therefore, the number (such as six) of bearings 112 (the second bearing member) may be larger than the number (such as three) of the bearings (the first bearing member) 114.

Figure 6:
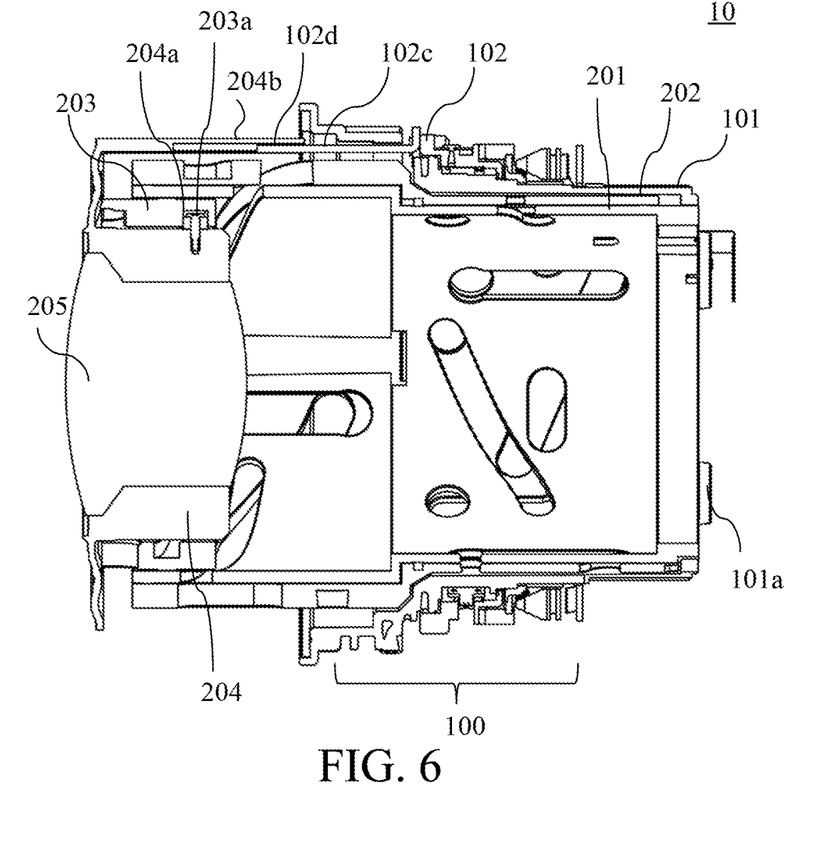
FIG. 6 is a sectional view of a lens barrel according to this embodiment.
Figure 7:
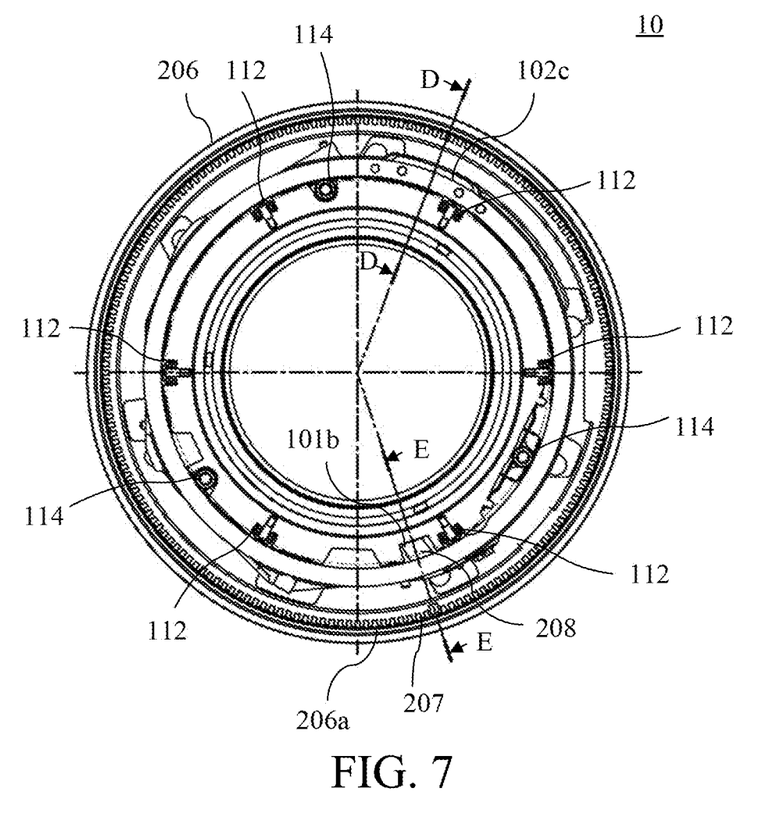
FIG. 7 is a sectional view of the lens barrel taken along the line A-A according to this embodiment.

Referring now to FIGS. 6 and 7, a description will be given of a lens barrel (lens apparatus) including the ultrasonic motor unit 100. FIG. 6 is a sectional view of the lens barrel 10 including the ultrasonic motor unit 100. FIG. 7 is a sectional view of the lens barrel 10 illustrated in FIG. 6 taken along the line A-A similar to FIG. 1. FIG. 6 corresponds to a sectional view taken along a line D-D in FIG. 7.

A guide barrel 201 is fixed onto the camera body 20 (see FIG. 9) and serves as a frame of the entire lens barrel 10. A cam ring 202 is engaged with the outer circumference of the guide barrel 201, held so as to be freely rotatable at a fixed position, and manually rotatable by an unillustrated zoom mechanism. A focus cam ring 203 moves in the optical axis direction (the direction along the line X-X in FIG. 1) by a cam mechanism including the guide barrel 201 and the cam ring 202. A focus lens barrel 204 holds a focus lens 205, and three cam followers 204a provided on the outer circumference of the focus barrel 204 are engaged with the cam groove 203a in the focus cam ring 203.

In the ultrasonic motor unit 100, a flange portion 101a provided at the end portion of the fixed barrel 101 is fixed onto the end surface of the guide barrel 201 with a screw or the like. A focus key 102c is fixed onto the end surface of the rotary ring 102 with a screw or the like, and a distal end portion 102d is engaged with a key groove 204b provided in a portion extending from the outer circumference of the focus lens barrel 204 in the optical axis direction and movable in the optical axis direction. This configuration can transmit only the rotational force of the ultrasonic motor unit 100 to the focus lens barrel 204 via the focus key 102c. The configuration according to this embodiment moves the focus cam ring 203 in the optical axis direction while rotating it in zooming, but the focus lens barrel 204 does not rotate and moves rectilinearly in the optical axis direction. In the focus operation, the focusing lens barrel 204 is rotated and moved in the optical axis direction by the ultrasonic motor unit 100 for focusing.

Figure 8:
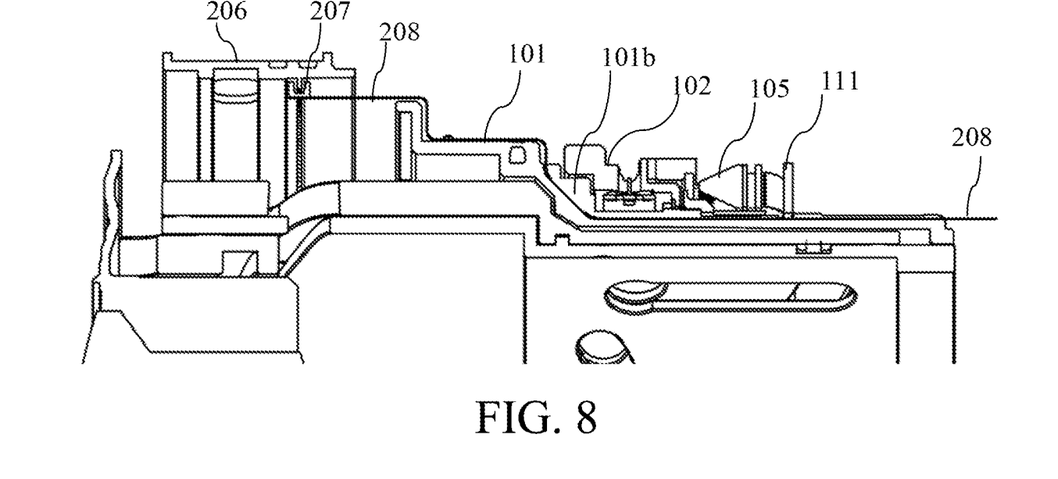
FIG. 8 is a sectional view of the lens barrel taken along a line E-E according to this embodiment.

Referring now to FIG. 8, a description will be given of a configuration of the manual focus operation. FIG. 8 is a sectional view taken along a line E-E in FIG. 7. The focus ring 206 is rotatably held by an exterior portion (not illustrated) and is manually rotatable. A comb tooth projection 206a is provided on the inner circumference of the focus ring 206. A photo-interrupter 207 is fixed to the exterior part (not illustrated) so as to sandwich the comb projections 206a. As the focus ring 206 rotates, the photo-interrupter 207 electrically detects a repetition of the light shield and the light transmission through the comb tooth projection 206a, and calculates a rotation angle of the focus ring 206. Driving of the ultrasonic motor unit 100 is controlled based on the calculated rotation angle. A scale 117 having a regularly continuous pattern is fixed on the inner circumference of the rotary ring 102. A sensor 118 detects the continuous pattern on the scale 117 and controls the rotation angle of the rotary ring 102 (see FIG. 5).

As illustrated in FIG. 8, the photo-interrupter 207 is electrically connected to an unillustrated control board by a flexible printed circuit board 208. The flexible printed circuit board 208 for an electrical connection extends in the image plane direction along the outer circumference of the fixed barrel 101. The flexible printed circuit board 208 is inserted through the groove 101b of the fixed barrel 101 between an inner circumference from the rotary ring 102 to the stator 105 and the spring press plate 111 and an outer circumference of the fixed barrel 101. As illustrated in FIGS. 3 and 7, the groove portion 101b is formed at a position (phase) on substantially the same circumference as that of the bearings 112 and 114 where the bearings 112 and 114 do not exist. As compared with the configuration that needs the ball race requiring the space over the entire circumference, this configuration can dispose part at a phase where none of the bearings 112 and 114 exist, and can improve the degree of freedom of the part arrangement and the space-saving efficiency. As a result, the lens barrel 10 can be made smaller.

This embodiment disposes the flexible printed circuit board 208 between the two adjacent bearings 112 included in the second bearing member, but the present invention is not limited to this embodiment. The flexible printed circuit board 208 may be disposed between the two adjacent bearings 114 included in the first bearing member or between the bearing 114 included in the first bearing member and the bearing 112 included in the second bearing member.

Where the ultrasonic motor unit 100 is employed in the lens barrel 10 as in this embodiment, the stator 105 and the rotor 104 in the ultrasonic motor unit 100 are often used for other lens barrels. Hence, the size of the optical system inside the lens barrel 10 is often limited by the sizes of the stator and the rotor. As a result, the spaces of the rotary ring and its supporting member are also limited, and a more compact arrangement is demanded. This embodiment can provide an effective configuration that meets this demand. Where it is necessary to rotatably support the ultrasonic motor unit steadily and accurately as in the case of the rotary ring of the ultrasonic motor unit according to this embodiment, a good holding mechanism can be disposed even in a limited space.

This embodiment has discussed the ultrasonic motor unit 100 in the lens barrel 10 so as to drive the focus lens 205, but the present invention is not limited to this embodiment. The configuration according to this embodiment is applicable to driving other lenses or rotating the cam ring. This embodiment is not limited to the motor unit, and is applicable to a support structure of a member that rotates relative to the fixed portion.

Referring now to FIG. 9, a description will be given of an imaging apparatus according to this embodiment. FIG. 9 is a configuration diagram of an imaging apparatus (single-lens reflex camera) 1. In FIG. 9, a lens barrel (interchangeable lens) 10 has an imaging optical system (lens unit) 11. A camera body (imaging apparatus body) 20 includes a quick return mirror 3, a focus plate 4, a penta-dach prism 5, an eyepiece 6, and the like. The quick return mirror 3 upwardly reflects a light flux formed via the imaging optical system 11. The focus plate 4 is disposed at an imaging position of the imaging optical system 11. The penta-dach prism 5 converts an inverse image formed on the focus plate 4 into an erect image. The user can observe the erect image through the eyepiece 6.

An image sensor 7 includes a CCD sensor or a CMOS sensor, photoelectrically converts an optical image (object image) formed via the imaging optical system 11, and outputs image data. In imaging, the quick return mirror 3 is retreated from the optical path, and an optical image is formed on the image sensor 7 via the imaging optical system 11. A controller 9 includes a CPU, and controls the operation of each component in the imaging apparatus 1.

While the imaging apparatus 1 includes the camera body 20 having the image sensor 7 and the lens barrel 10 detachably attached to the camera body 20, the present invention is not limited to this embodiment. The present invention is applicable to an imaging apparatus in which a camera body and a lens barrel are integrally formed, or a mirrorless nonreflex camera (mirrorless camera) having no quick return mirror.

This embodiment can provide a compact rotational force transmitting apparatus, a lens barrel and an imaging apparatus having the same, which can steadily hold the rotating member.

This embodiment discusses the interchangeable lens as the lens barrel for still imaging and motion imaging, but is applicable to the lens barrel such as optical systems for a projection lens and a copier. The present invention is not limited to a motor unit in the lens barrel, but is applicable to a support structure of a member that rotates relative to a fixed portion in a product other than the lens barrel.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-045154, filed on Mar. 13, 2018, which is hereby incorporated by reference herein in its entirety.

What is claimed is:

1. A rotational force transmitting apparatus comprising:
a cylindrical fixed member;
a rotating member configured to rotate around the cylindrical fixed member;
a first bearing member held by the cylindrical fixed member and configured to rotate around an axis parallel to a rotation axis of the rotating member; and
a second bearing member held by the cylindrical fixed member and configured to rotate around a radial direction of the rotating member,
wherein the rotating member is rotatably held by the first bearing member and the second bearing member, and
wherein the first bearing member and the second bearing member are arranged on the same circumference on a plane orthogonal to the rotation axis of the rotating member.

2. The rotational force transmitting apparatus according to claim 1, wherein each of the first bearing member and the second bearing member includes a plurality of bearings around the rotation axis of the rotating member.

3. The rotating force transmitting apparatus according to claim 1, wherein the first bearing member and the second bearing member do not overlap each other when viewed from a rotation axis direction of the rotating member.

4. The rotational force transmitting apparatus according to claim 1, further comprising a first biasing member configured to bias the first bearing member in the radial direction.

5. The rotational force transmitting apparatus according to claim 4, wherein a first bearing among a plurality of bearings included in the first bearing member is biased by the first biasing member, and a second bearing among the plurality of bearings included in the first bearing member is fixed.

6. The rotational force transmitting apparatus according to claim 4, further comprising a second biasing member configured to bias the rotating member against the second bearing member.

7. The rotational force transmitting apparatus according to claim 6, wherein the rotating member includes an annular rotor, and the second biasing member is a spring member configured to press a stator against the rotor.

8. The rotational force transmitting apparatus according to claim 6, wherein a biasing force of the second biasing member is larger than that of the first biasing member and the number of second bearing members is larger than that of first bearing members.

9. The rotational force transmitting apparatus according to claim 1, further comprising a flexible printed circuit board used for an electric connection and disposed between adjacent bearings included in the first bearing member, between adjacent bearings included in the second bearing member, or between the bearing included in the first bearing member and the bearing included in the second bearing member.

10. The rotational force transmitting apparatus according to claim 1, wherein the rotational force transmitting apparatus is an ultrasonic motor unit.

11. A lens apparatus comprising:
a lens; and
a rotational force transmitting apparatus that includes a cylindrical fixed member, a rotating member configured to rotate around the cylindrical fixed member, a first bearing member held by the cylindrical fixed member and configured to rotate around an axis parallel to a rotation axis of the rotating member, and a second bearing member held by the cylindrical fixed member and configured to rotate around a radial direction of the rotating member,
wherein the rotating member is rotatably held by the first bearing member and the second bearing member, and
wherein the first bearing member and the second bearing member are arranged on the same circumference on a plane orthogonal to the rotation axis of the rotating member.

12. An imaging apparatus comprising:
a lens apparatus comprising a lens and a rotational force transmitting apparatus that includes a cylindrical fixed member, a rotating member configured to rotate around the cylindrical fixed member, a first bearing member held by the cylindrical fixed member and configured to rotate around an axis parallel to a rotation axis of the rotating member, and a second bearing member held by the cylindrical fixed member and configured to rotate around a radial direction of the rotating member;
an image sensor configured to photoelectrically convert an optical image formed by the lens apparatus; and
a camera body configured to hold the image sensor,
wherein the rotating member is rotatably held by the first bearing member and the second bearing member, and
wherein the first bearing member and the second bearing member are arranged on the same circumference on a plane orthogonal to the rotation axis of the rotating member.

13. The imaging apparatus according to claim 12, wherein the lens apparatus is attachable to and detachable from the camera body.

* * * * *